United States Patent
Kierat

(10) Patent No.: US 9,022,729 B2
(45) Date of Patent: May 5, 2015

(54) ADJUSTING DEVICE FOR A CHARGER, IN PARTICULARLY AN EXHAUST GAS TURBOCHARGER

(75) Inventor: Jaroslaw Kierat, Frankenthal (DE)

(73) Assignee: IHI Charging Systems International GmbH, Heidelberg (DE)

(*) Notice: Subject to any disclaimer, the term of this patent is extended or adjusted under 35 U.S.C. 154(b) by 526 days.

(21) Appl. No.: 13/489,184

(22) Filed: Jun. 5, 2012

(65) Prior Publication Data

US 2012/0243973 A1    Sep. 27, 2012

Related U.S. Application Data

(63) Continuation-in-part of application No. PCT/EP2010/006384, filed on Oct. 19, 2010.

(30) Foreign Application Priority Data

Dec. 9, 2009  (DE) .......................... 10 2009 057 664

(51) Int. Cl.
  *F01D 17/16*   (2006.01)
  *F02C 6/12*   (2006.01)

(52) U.S. Cl.
  CPC ................ *F01D 17/165* (2013.01); *F02C 6/12* (2013.01); *F05D 2220/40* (2013.01)

(58) Field of Classification Search
  CPC ............................. F01D 17/165; F02D 23/005
  USPC .................................................. 415/164, 165
  See application file for complete search history.

(56) References Cited

U.S. PATENT DOCUMENTS

| | | | |
|---|---|---|---|
| 4,804,316 A * | 2/1989 | Fleury ........................... | 417/407 |
| 2011/0138805 A1* | 6/2011 | Barthelet et al. ................ | 60/602 |
| 2012/0237339 A1* | 9/2012 | Streich et al. ................. | 415/140 |
| 2013/0084161 A1* | 4/2013 | Groves et al. ................. | 415/110 |

FOREIGN PATENT DOCUMENTS

| | | |
|---|---|---|
| WO | WO 2007/093407 A1 | 8/2007 |
| WO | WO 2007/034787 A1 | 11/2007 |

\* cited by examiner

*Primary Examiner* — Ninh H Nguyen
(74) *Attorney, Agent, or Firm* — Klaus J. Bach

(57) ABSTRACT

In an adjusting device for a charger device, in particular an exhaust gas turbocharger, with a holding ring on which a plurality of guide vanes is mounted in an operative connection with an actuating ring via a respective connecting element and whose respective angle of attack is adjustable by rotation of the actuating ring, the respective connecting elements are in an operative connection with the actuating element via at least one effective area which extends slant to the axial direction of the adjusting device so as to bias the connecting elements and the guide vanes associated therewith in a predetermined axial direction.

4 Claims, 2 Drawing Sheets

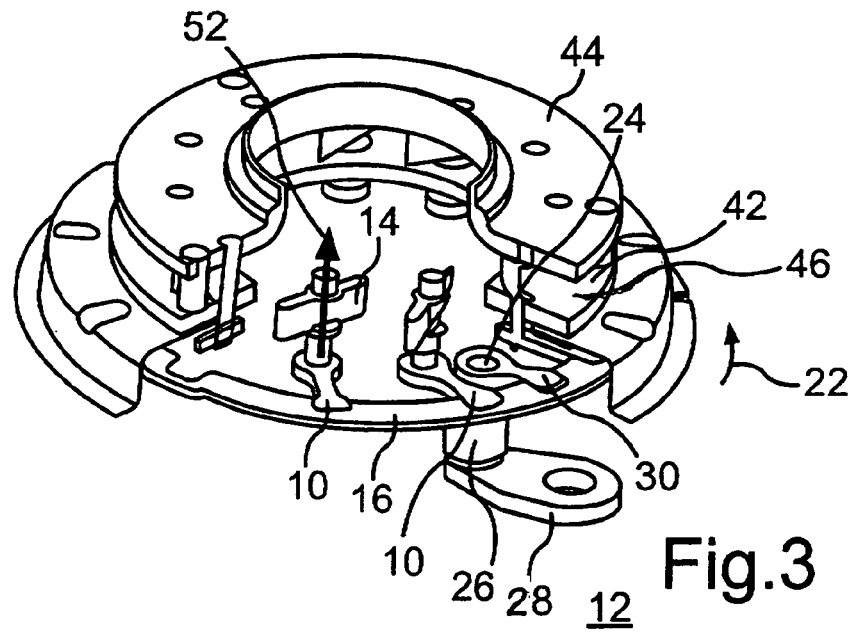
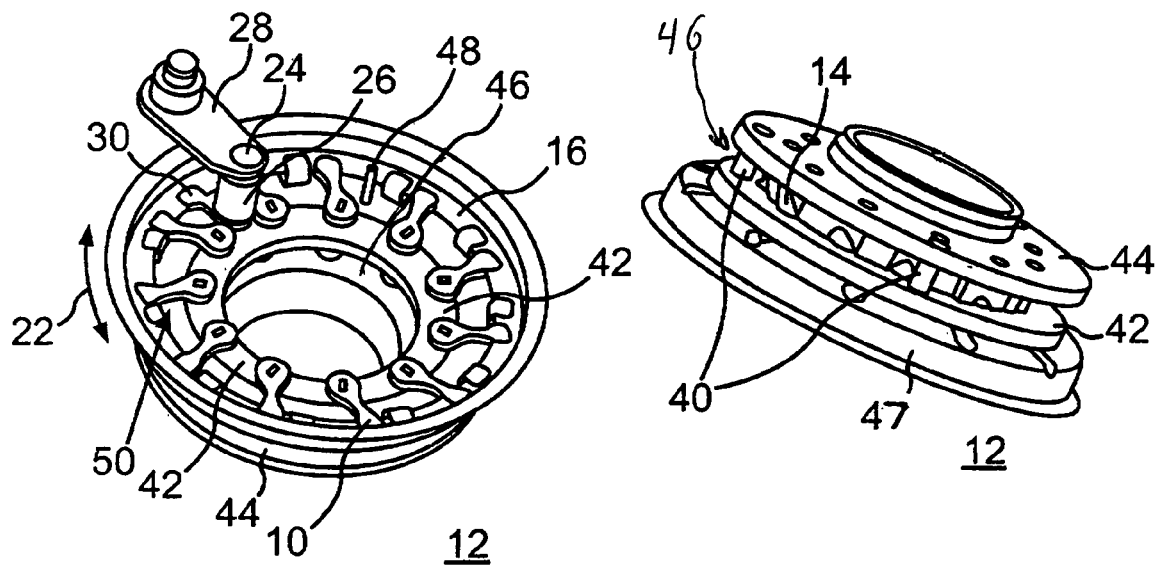

ADJUSTING DEVICE FOR A CHARGER, IN PARTICULARLY AN EXHAUST GAS TURBOCHARGER

This is a Continuation-In-Part application of pending international patent application PCT/EP2010/006384 filed Oct. 19, 2010 and claiming the priority of German patent application 10 2009 057 664.9 filed Dec. 9, 2009.

BACKGROUND OF THE INVENTION

The invention relates to an adjusting device for a charging device, in particular for an exhaust gas turbocharger.

WO 2007/093407 A1 discloses a turbocharger with variable turbine geometry, which includes a turbine casing with a supply duct for the exhaust gases, a turbine rotor which is rotatably supported in the turbine casing, and a guide baffle which surrounds the turbine rotor and which comprises a vane support ring, including a plurality of guide vanes, each with a vane shaft which is supported in the vane support ring. An adjusting ring is operatively connected to the guide vanes via associated vane levers which are attached at one end of the vane shafts. Each vane lever comprises a lever head at the other end, which is accommodated in an associated engaging recess of the adjusting ring. Thereby, each vane shaft is constructed asymmetrically and comprises an arc segment-shaped bearing lug at only one side of a center portion, which is disposed in the same plane as the lever head.

This turbocharger has undesirably high gap losses which have a negative impact on the operational efficiency of the turbocharger.

It is therefore the principle object of the present invention to provide an adjusting device for a charging device, which allows a more efficient operation.

SUMMARY OF THE INVENTION

In an adjusting device for a charger device, in particular an exhaust gas turbocharger, with a holding ring on which a plurality of guide vanes is mounted in an operative connection with an actuating ring via a respective connecting element and whose respective angle of attack is adjustable by rotation of the actuating ring, the respective connecting elements are in an operative connection with the actuating element via at least one effective area which extends slant to the axial direction of the adjusting device so as to bias the connecting elements and the guide vanes associated therewith in a predetermined axial direction This effective area which extends obliquely to the axial direction of the adjusting device and which is provided e. g. at the connecting element or at the actuating element, with an effective area each may be provided at both the connecting element and the actuating element, which extend essentially parallel to one another, enables a defined positioning of the connecting element which is formed e.g. as a connecting plate in the axial direction of the impeller and thus in a direction parallel to an axis of rotation of the guide vanes, so that gap losses of the adjusting device and therefore of the charging device as a whole are considerably reduced. This provides for a highly efficient operation of the charging device which therefore results in an improved engine operating efficiency.

Moreover, the inventive adjusting device is subjected to considerably lower wear and thus a lower probability of failure because an uncontrolled movement of the respective connecting element together with the associated guide vane in the axial direction is prevented.

At the same time, the inventive adjusting device offers the possibility to vary the respective angle of attack of the guide vanes by the actuating element via the respective connecting element, in order to realize an optimum adaptation of the impeller to the flow conditions. This makes a highly efficient operation of the charging device over a very wide spectrum of operating points possible, for example, of an internal combustion prime mover which includes the charging device. It provides for low fuel consumption and therefore low $CO_2$ emissions of the internal combustion prime mover. The adjustment of the angle of attack is made, e. g. by a rotation about the axis of rotation of the respective guide vane, with the actuating element cooperating with the connecting element via the inventive effective area or the inventive effective areas, respectively, which ultimately rotates the guide vanes.

The connecting element then engages, for instance, a groove of the actuating element. The opposite configuration is also possible, e. g. an arrangement where a corresponding part of the actuating element engages a groove of the connecting element.

In each case, the slant effective area or the slant effective areas, respectively, provide a thrust of the respective guide vane in the axial direction, so that the above mentioned advantages can be achieved.

In an advantageous embodiment of the invention, a rotor wheel is provided which is configured as a turbine wheel, wherein the respective guide vane may be moved by means of the slant effective area or the slant effective areas, respectively, in the direction of a turbine wheel outlet. The slant orientation of the effective area is dependent on the respective direction of movement of the actuating element. In the case of the actuating element in the form of an adjusting ring, a correspondingly slant configuration of the effective area or the effective areas, respectively, is provided so that, upon rotation, the respective connecting element and thus the respective guide vane are biased in the direction of the turbine wheel outlet.

Upon rotation of the adjusting ring in the opposite direction, however, a configuration opposite to the first configuration of the effective area or the effective areas, respectively, is necessary. When viewing for example a longitudinal section of the effective area or the effective areas, respectively, of the inventive adjusting device, the effective area has e. g. a wedge shape which in the axial direction forms an ascending ramp in the direction in which the connecting element and thus the respective rotor blade is to be moved or biased, respectively, for example in the direction of the turbine wheel outlet.

This slant effective area is formed, for example, by means of a metal powder injection molding method, by means of which the respective connecting element and/or the respective rotor blade and/or the actuating element are manufactured. With such a metal powder injection molding method, the inventive slant effective area may, for example, can be formed by a hardening process during which contact areas are hardened, via which the connecting element and the actuating element come in contact with each other for establishing the operative connection.

The slant effective area provides for an operation of the actuating element which generates a force component in the axial direction of the adjusting device, acting on the connecting element, so that the connecting element and therefore the guide vane are moved in the corresponding axial direction. A reaction force effective by the connecting element on the actuating element results from a gas impulse on the guide vane, which is transmitted via the connecting element to the actuating element.

The invention will become more readily apparent from the following description of a preferred exemplary embodiment thereof with reference to the accompanying drawings. The features and feature combinations as previously mentioned in the description as well as the features and feature combinations which will be mentioned in the following description of the figures and/or which are solely illustrated in the figures are not only applicable in the respective indicated combination but also in other combinations or isolated, without deviating from the scope of the invention.

BRIEF DESCRIPTION OF THE DRAWINGS

FIG. 3 shows a perspective partial view of an embodiment of the inventive adjusting device; and FIGS. 4A and 4B show two perspective views of the adjusting device according to FIG. 3.

DETAILED DESCRIPTION OF A PARTICULAR EMBODIMENT

Figure 1:
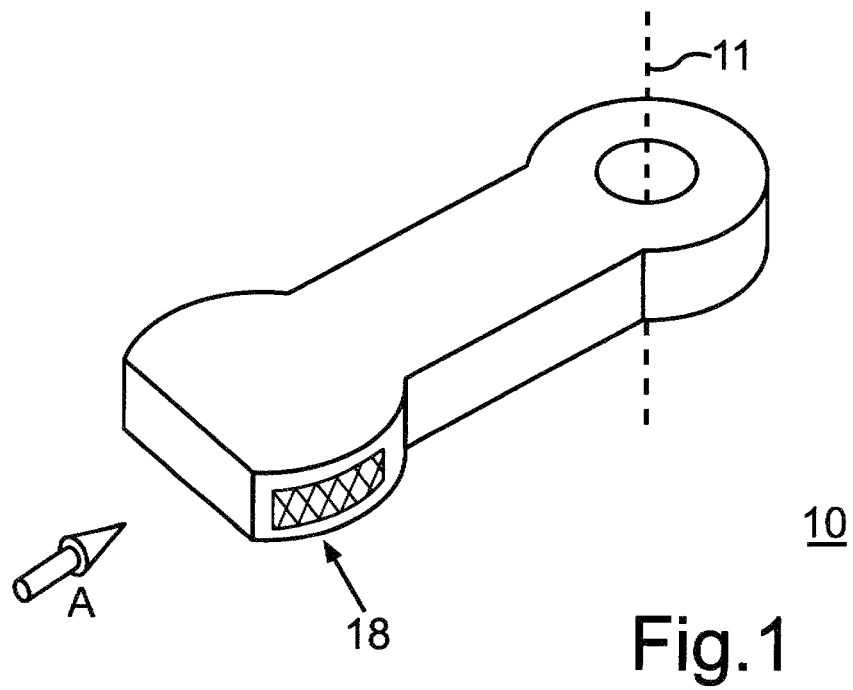
FIG. 1 shows in a perspective view an embodiment of a connecting element of the inventive adjusting device.

FIG. 1 shows a connecting element 10 of an adjusting device 12 (FIGS. 3 and 4) by means of which the angle of attack of a respective guide vane 14 (FIG. 3) which is held in a retaining ring 42 (FIGS. 3 and 4) is adjustable by means of an actuating element in the form of an adjusting ring 16. The adjusting device 12 comprises a plurality of such guide vanes 14 and connecting elements 10, with only one guide vane 14 and one connecting element 10 being identified by reference numerals in FIGS. 3 and 4 for the sake of clarity.

For adjusting the angle of attack, the connecting element 10 needs to be brought into an operative connection with the adjusting ring 16 via respective contact areas 18 and 20, which is done by rotating the adjusting ring 16 in accordance with a direction arrow 22. The rotation of the adjusting ring 16 is effected via an adjusting shaft 24 which is supported by a bearing structure 26 in a housing (not shown) of the adjusting device 10. The adjusting shaft 24, in turn, is operated by an adjusting arm 28 which, in turn, may be operated by an actuator (not shown). The rotation of the adjusting shaft 24 is transferred via an adjusting lever 30 to the adjusting ring 16, with the adjusting lever 30 engaging a corresponding groove of the adjusting ring 16. Likewise, the connecting elements 10 engage corresponding grooves of the adjusting ring 16.

As can best be seen in FIGS. 4A and 4B, corresponding flanks of the connecting elements 10 come into contact, and thus into operative connection, with corresponding edges of the adjusting ring 16 upon rotation of the adjusting ring 16, so that the contact areas 18 and 20 are in abutment. The rotation of the adjusting ring 16 results in a rotation or pivoting motion, respectively, of the connecting element 10 about an axis of rotation 11.

Figure 2:
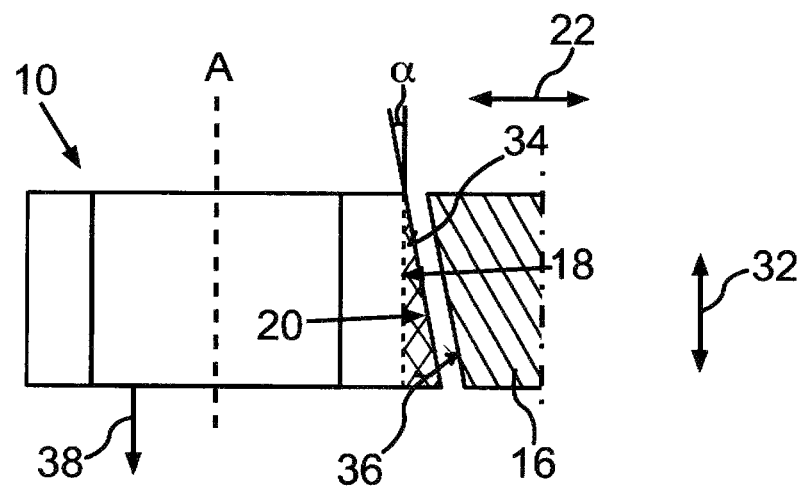
FIG. 2 shows a sectional view of the connecting element according to FIG. 1 as well as of an actuating element of the inventive adjusting device, by means of which the connecting element and thus a guide vane of the adjusting device are adjustable.

As can be seen from FIG. 2, the respective connecting elements 10 and the adjusting ring 16 may be brought into an operative connection via the effective areas 34 and 36 which extend aslant to the axial direction in accordance with a direction arrow 32 of the adjusting device 12. In this way, the connecting element 10 and thus of the guide vane 14 is biased in a direction parallel to the axial direction that is in the direction of arrow 32 toward a turbine wheel outlet as indicated by a direction arrow 38.

This thrust provides for a defined axial positioning of the connecting element 10 and thus of the guide vane 14 and thereby prevents their uncontrolled movement in this direction, which provides for very low wear of the adjusting device 12. Moreover, this defined axial positioning of the connecting element 10 and the guide vane 14 has a beneficial effect on the gap losses of the adjusting device, which are therefore very small, so that an efficient operation of the charging device, e. g. an exhaust gas turbocharger, for which the adjusting device 12 may be employed, is possible. This means an increase in efficiency of the charging device, which also has a positive effect on an internal combustion prime mover which is used in connection with the adjusting device 12 so that fuel consumption and $CO_2$ emissions may be kept low.

According to FIGS. 3, 4A and 4B, the adjusting device 12 additionally comprises spacer bolts 40 by means of which the holding ring 42 is spaced by a ring element 44 which forms a nozzle 46. In addition, a support ring 47, a stop pin 48 as well as a support ring 50 assigned to the adjusting ring 16 are provided.

In FIG. 3, a direction arrow 52 identifies the direction in which the connecting elements 10 and thus the guide vanes 14 may be moved or biased, respectively, due to the slant orientation of the effective areas 34, 36.

FIG. 2 is an exemplary illustration from which it may be seen that an angle $\alpha$ is included between the effective area 34 and the axial direction in accordance with the direction arrow 32. This angle represents the slant effective area 34, that is the effective area 36 is also slant at least essentially and extends parallel to the effective area 34. In this way, the defined positioning of the actuating elements 10 and thus of the guide vanes 14 is realised. The adjusting device 12 may be employed in a similar manner in other application, for example, in connection with a compressor of the charging device.

What is claimed is:

1. An adjusting device (12) for an exhaust gas turbocharger, including a guide vane holding ring (42), a plurality of flow guide vanes (14) pivotally supported on the holding ring (42) and disposed in an annular array at one side of the holding ring (42), a plurality of connecting elements (10) disposed at the opposite side of the holding ring (42) and being connected to the flow guide vanes (14) for common pivotal movement, an adjusting ring (16) with engagement areas (36) in contact with corresponding contact areas (34) of the connecting elements (10) for pivoting the connecting elements (10) and the associated flow guide vanes (14) by rotation of the adjusting ring (16), the engagement areas (36) of the adjusting ring (16) and the contact areas (34) of the connecting elements (10) being slanted with respect to the axial direction of the adjusting ring (16) so as to bias the connecting elements (10) and the flow guide vanes (14) associated therewith in a predetermined axial direction.

2. The adjusting device (12) according to claim 1, wherein the flow guide vanes (14) are rotatably supported by the guide vane holding ring (42).

3. The adjusting device (12) according to claim 1, wherein, with an application of the device in an exhaust gas turbine, the respective flow guide vanes (14) are biased, by means of the slanted engagement areas (34, 36), in the direction toward a turbine wheel outlet (46).

4. The adjusting device (12) according to claim 1, wherein at least one of the respective connecting elements (10), the respective guide vanes (14) and the adjusting ring (16) is formed by a metal powder injection molding method.

* * * * *